United States Patent [19]

Tyler

[11] 4,230,731
[45] Oct. 28, 1980

[54] MICROWAVE COOKING METHOD AND CONTROL MEANS

[75] Inventor: Hugh J. Tyler, Santa Ana, Calif.

[73] Assignee: Robertshaw Controls Company, Richmond, Va.

[21] Appl. No.: 909,461

[22] Filed: May 25, 1978

[51] Int. Cl.² ............................................. A01K 43/00
[52] U.S. Cl. ..................................... 426/233; 73/352; 99/DIG. 14; 219/10.55 B; 219/10.55 M; 426/243
[58] Field of Search ....................... 426/243, 233, 234; 219/10.55 M, 10.55 A, 10.55 E, 10.55 B; 99/DIG. 14; 73/352

[56] References Cited

U.S. PATENT DOCUMENTS

| | | | |
|---|---|---|---|
| 3,651,405 | 3/1972 | Whitney et al. | 73/352 |
| 3,694,608 | 9/1972 | Loubert et al. | 219/10.55 B |
| 3,713,846 | 1/1973 | Turner et al. | 426/243 |
| 3,839,616 | 10/1974 | Risman | 219/10.55 R |
| 3,854,022 | 12/1974 | Moore | 426/234 |
| 3,875,361 | 4/1975 | Fukui et al. | 219/10.55 B |
| 4,036,995 | 7/1977 | Koether et al. | 426/233 |
| 4,081,645 | 3/1978 | Joves et al. | 219/10.55 B |
| 4,162,381 | 7/1979 | Buck | 219/10.55 B |

Primary Examiner—Joseph M. Golian
Assistant Examiner—George C. Yeung
Attorney, Agent, or Firm—Fulwider, Patton, Rieber, Lee & Utecht

[57] ABSTRACT

There is disclosed a method, and apparatus for practicing the method, of controlling microwave cooking. A temperature measuring probe monitors the temperature of a comestible during cooking which is interrupted at a predetermined time in the cooking cycle and the comestible is permitted to equilibrate to a true temperature. This true temperature is detected and the cooking is resumed in a manner responsive to the detected, true temperature, e.g., the input power level is selected based on the differential value between the true and desired final temperatures, whereby the rate of cooking is reduced when the true temperature is close to the final temperature to permit the comestible to coast to the final temperature, insuring against over-cooking. The direction of the temperature error between the instantaneous and true temperatures can also be used to control the cooking process as, for example, the power level can be reduced if the instantaneous temperature is less than the true temperature. In other embodiments, the true temperature of the comestible can be determined at one or more predetermined times during an initial portion of the cooking cycle to determine the rate of cooking of the comestible and this information can be used to estimate the completion time of cooking, and/or to control the cooking process to conform to a preselected cooking pattern.

7 Claims, 10 Drawing Figures

MICROWAVE COOKING METHOD AND CONTROL MEANS

BACKGROUND OF THE INVENTION

1. Field of the Invention

This invention relates to a control system for cooking of a comestible and, in particular, to a method and system for controlling cooking in a microwave oven.

2. Brief Statement of the Prior Art

The cooking of comestibles such as meats and the like has never been precisely controlled. Conventionally heated ovens have employed timing mechanisms to control the oven or indicate to the cook an approximation of the cooked condition of the comestible. This crude method of control, while marginally acceptable for conventional cooking, is entirely unsuitable for the more efficient and rapid microwave cooking.

Prior investigators have recognized the unsuitability of timer controls for microwave ovens and have attempted to employ temperature probes for monitoring the temperature of the comestible during the cooking process. One commercial unit employs a temperature probe on an umbilical cord which can be connected to suitable oven controls and/or temperature display panels.

Unfortunately, temperature probes in a comestible such as meat and the like, often do not reflect the true temperature of the meat and can result in improperly cooked products when employed in a control system for the oven. A typical comestible such as meat and the like does not heat uniformly when exposed to microwave energy; typically fat and bony tissue will heat more rapidly than other portions of the meat. When the temperature probe is inserted in the meat, the probe will read anomalous temperatures caused, in part, by the nonuniform response of the meat to the cooking process.

The nonuniformity in response of the comestible to the cooking process also can cause overshooting or overcooking of the comestible if the cooking process is conducted with high power applications during the final stages of cooking when the temperature of the comestible is close to the desired final temperature.

BRIEF STATEMENT OF THE INVENTION

This invention comprises a method and apparatus for control of a cooking process and, in particular, to the control of microwave cooking of comestibles such as meat and the like.

The cooking system employs a temperature probe, preferably a telemetric temperature probe, which is inserted into the comestible for monitoring temperature during the cooking process. Improper cooking which can result from anomalous temperature detection is avoided by interrupting the cooking for a brief period to permit the comestible to equilibrate to a true (averaged) temperature which is detected by the probe and used to control the remainder of the cooking process. The magnitude and direction of the difference between the true and instantaneous temperatures reflects anomalies in the instantaneous temperature caused by nonuniform heating of the comestible. This difference or error can be used to control power settings of the oven or to correct temperature detections to avoid overcooking of the comestible.

In a preferred application, the control system is operative to reduce the power input when the comestible's true temperature approaches the desired final temperature and the cooking is finished at a reduced power input so that the degree of irregularity in the cooking throughout the comestible is greatly reduced and the comestible does not coast past the desired temperatures to an overcooked condition.

In other embodiments, the cooking system can permit determination of the time for cooking of the comestible. This is achieved by determining temperatures of the comestible at selected times in the cooking cycle, and comparing the first determination to a subsequent determination to indicate the rate of cooking of the comestible. The rate of cooking can be compared to the desired final cooked temperature to estimate the cooking time which can be displayed on a suitable panel of the oven, continuously updated, as necessary or desired.

BRIEF DESCRIPTION OF THE DRAWINGS

The invention will be described by reference to the illustrated embodiment of which.

DESCRIPTION OF PREFERRED EMBODIMENTS

Figure 1:
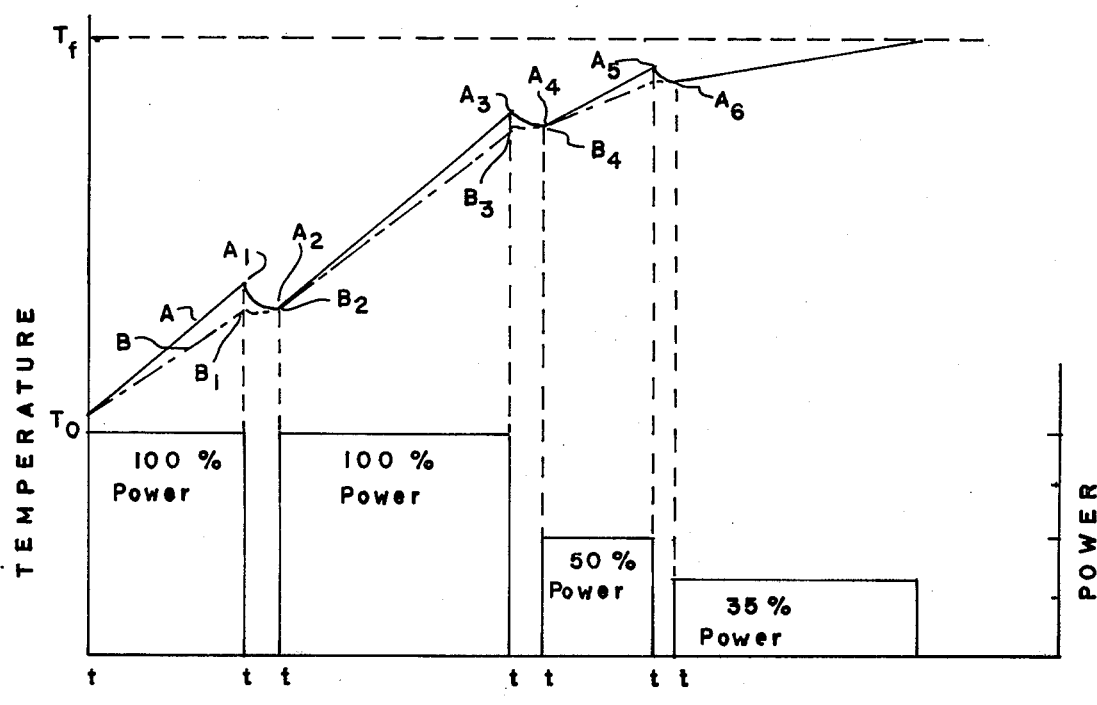
FIGS. 1 and 2 are graphical depictions of a cooking cycle using the method of the invention.

FIG. 1 graphically depicts the cooking cycle as typically practiced by the method of the invention. The graph depicts the temperature of the comestible against the time of the cooking cycle. The instantaneous temperature which is detected by the probe is shown in the solid line A while the average or true temperature of the comestible is shown by the broken line B. The temperature of the comestible at the commencement of the cooking $t_0$ is $T_0$. The probe is inserted into the comestible and quickly reaches the comestible temperature $T_0$. The comestible and probe are placed in the microwave oven and the microwave oven is turned on at a power level, typically at 100 percent of its rated power.

The application of the microwave energy commences the cooking cycle and the comestible temperature increases. Typically, the instantaneously sensed temperature of the probe will be at somewhat higher value than the true or average temperature of the comestible and the sensed temperature depicted by line A increases more rapidly than the true temperature indicated by line B. At a predetermined time in the cooking process, the application of the microwave energy is interrupted. This is shown at time $t_1$ and the sensed temperature is at value $A_1$ with the true temperature at $B_1$. The time for interruption of the application of power can be a predetermined time interval, e.g., after 5, 10, or 15 minutes in the cooking cycle. Preferably, however, the cooking cycle is interrupted after the comestible has been heated a predetermined amount, i.e., at a predetermined value of temperature $A_1$ or after a predetermined initial temperature rise $\Delta T_1$ which is the difference between temperature $A_1$ and the initial temperature $T_0$. Typically, this incremental temperature increase can be from 25° to 75° F., preferably from about 30° to 50° F. Alternatively, since most cooking processes will commence with the comestible at a temperature from about 32° F. to ambient temperatures, e.g., 75° F., the cooking cycle can, if desired, be interrupted when the sensed temperature reaches a predetermined value, e.g., 90°–125° F. In either event, it is preferred to interrupt the cooking for the initial equilibration based on the temperature response of the comestible since the latter is more directly applicable to a variety of variables such as size of comestible, type of comestible, e.g., quantity of fat and/or bone in a meat product, etc.

With the cessation of application of microwave energy, the comestible begins to equilibrate to a true or average temperature. This will be reflected by a falling of the sensed temperature which approaches the true temperature as indicated by a convergence of lines A and B during the time interval from $t_1$ to $t_2$. The graph indicates that during this time interval there is a slight decrease in the true or average temperature of the comestible from $B_1$ to $B_2$; this corresponds to a slight cooling of the comestible during this time interval and this cooling will follow along a uniform cooling curve for the particular comestible. The sensed temperature, however, will initially follow a more rapid decline, exhibiting an asytomic decline in temperature. The temperature of the probe is monitored at periodic intervals between times $t_1$ and $t_2$, e.g., the temperatures are observed at one minute intervals. Within a short period of time, it will be observed that the sensed temperature rate of decline reduces markedly, corresponding to the transition from the steep slope to the more shallow slope of the asytomic curve. At this point, the sensed temperature will coincide or closely approximate the true or average temperature of the comestible., i.e., temperature $A_2$ will be substantially equal to the true temperature $B_2$. At this point, the operator recommences the application of the microwave energy and the cooking process. The resumption of the cooking process is, however, dictated by the observations made during the initial cooking period and the first interrupted time interval. This information includes the following:

1. Absolute sensed temperature $A_1$ (or incremental temperature rise $\Delta T$);
2. Time duration $\Delta t_1$;
3. Deviation in sensed temperature ($A_1-B_1$).

The aforementioned information can be used in a number of control applications. The temperature response of the comestible to the application of the microwave energy reflects the size and nature of the particular comestible and, accordingly, the subsequent cooking process can be controlled in response to the rate of temperature rise. Accordingly, the duration of the succeeding cooking period, $t_2$ to $t_3$ can be chosen in response to the temperature response of the comestible, for example, if the comestible rapidly increases in temperature, the duration of the succeeding cooking period is of a shorter span than if the comestible temperature increases more slowly. The rate of heating of the comestible is reflected either by the temperature which the comestible reaches after a predetermined time interval, or, alternatively, by the length of time requried to reach a predetermined temperature, in the manner previously described.

The degree of error between the sensed and average temperature can also be used to control the cooking process. When the degree of error is relatively minor, e.g., within a few degrees, the operator is assured that the sensed temperature is reasonably accurate and more reliance can be placed on the sensed temperature during the remainder of the cooking process. A large error, e.g., greater than about 3 degrees will indicate to the operator that the sensed temperature is erroneous and the cooking cycle should be controlled when the comestible approaches the final desired temperature to avoid overshooting of the control temperature. The overshooting is undesirable since, even if the comestible equilibrates to a true or average temperature which is not in excess of the final desired temperature, some portions of the comestible are overheated and overcooked.

In any event, the duration of the succeeding cooking period $t_2$ to $t_3$ and/or the intensity of the application of the microwave energy, i.e., the power level, are adjusted in response to the sensed and true temperatures of the comestible. In the usual case, the first interruption of the cooking cycle will be in its initial stages and the cooking cycle can be resumed at full power for a substantial period, e.g., for from 35 to about 85 percent of the total cooking. The cooking cycle is than interrupted at time $t_3$ which can be after a predetermined time interval or can be when the sensed temperature approaches a predetermined proximity to the desired final temperature. Thus, if the instantaneous sensed temperature is substantially above the true temperature, the sensed temperature can more closely approach the final temperature whereas in instances where the sensed temperature is less than the true temperature, the heating is interrupted at a value below the final temperature desired.

The preferred method will provide a second interrupted period from $t_3$ to $t_4$ to permit the comestible temperature to equilibrate to an average, true temperature. This is indicated in the decrease in the sensed temperature from temperature $A_3$ to $A_4$. As, with the previously described equilibration period, the temperature is monitored at incremental periods, typically at 30 second to 1 minute intervals and the cooking process is recommenced when the sensed temperature reaches a constant value or when the rate of change of the sensed temperature approximates the cooling rate of the comestible. At time $t_4$ the heating is resumed. The proximity of the sensed temperature $A_4$ to the final temperature, $T_f$, is considered by the operator in selecting the new power setting. When the sensed temperature is within about 20° of the final temperature, i.e., the difference $T_f-A_4$ is 20° or less, the operator will desirably select a reduced power level setting for the microwave oven. This is shown with the resumption of power at a 50 percent value at time $t_4$. Cooking of the comestible at the reduced power setting is reflected by a more shallow incline in the rate of heating curve A and also, to some extent, by a lesser difference between the true temperature B and the detected temperature. After a preselected time period, $t_4-t_5$, the heating can again be interrupted and the instantaneous sensed temperature $A_5$ can be permitted to equilibrate to the true temperature $B_6$ or a very close approximation thereof. Thereupon, the microwave energy is reapplied to the comesti- The basic oscillator frequency is approximately 13,400 Hertz when operated under normal conditions, e.g., 77° F. It should be appreciated that the thermistor R-15 controlled oscillator is utilized as the temperature sensing device and thus its frequency is variable with temperature as will be described in detail below. The frequency which is broadcast by the inductor antenna L-1 in the very low to low frequency range. It has been found that this frequency range, e.g., from 10,000 to about 50,000 Hertz, is readily received by the receiving antanna configuration described below. Despite the relatively low frequency of the broadcast signal, a sufficiently strong signal can be broadcast with a very compact antenna, thereby providing a very small probe unit. The broadcast, very low to low frequency signal will propagate throughout the oven compartment 20 to a receiving antenna as described below. Values for the components shown in FIG. 4 will be found in Table 1 of Appendix A below.

Figure 4:
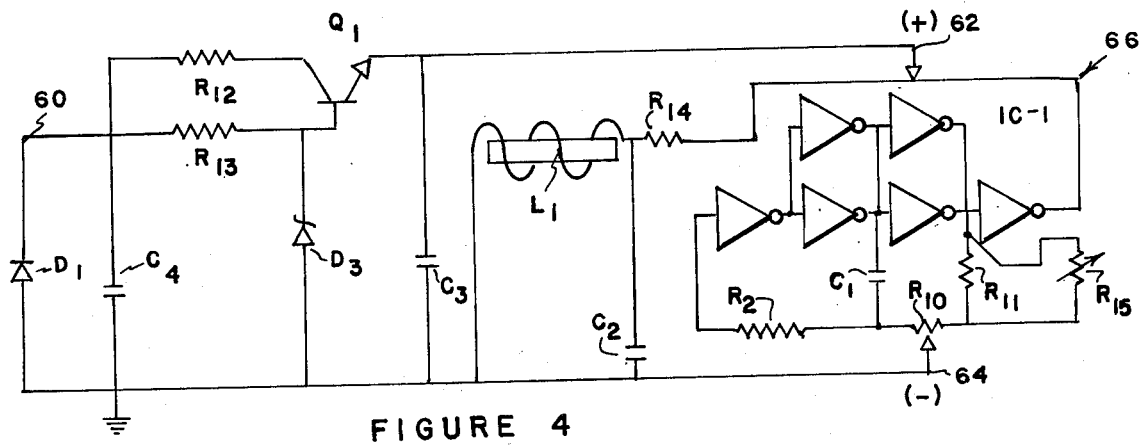
FIG. 4 is an electrical schematic of the telemetering probe circuit of the control system.
Figure 5:
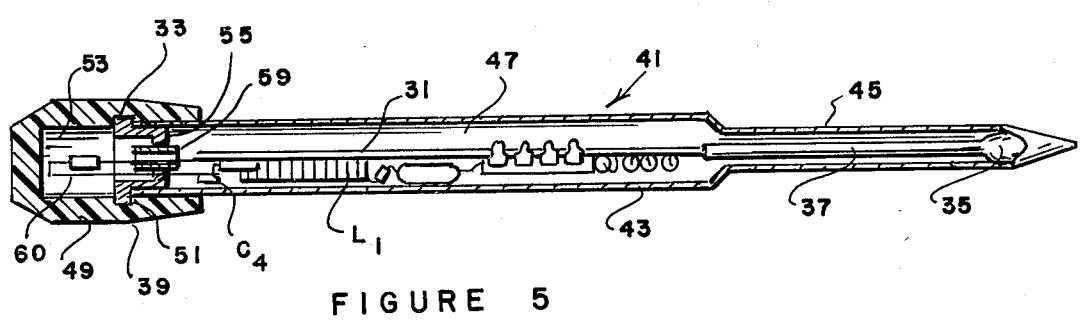
FIG. 5 is a sectional view of the telemetering probe.

The probe circuit assembly is fitted into a probe housing as shown in FIG. 5. The housing 41 is a tubular member having a body section 43 and a probe section 45 of lesser diameter. Thermister R-15 (FIG. 4) is encapsulated in a bulb 35 which is distally supported on ceramic tube 37 that is extended into probe section 45 with the bulb 35 seated in the tip end of section 45. Circuit board 31 and the electrical components carried thereon are positioned in body section 43 with end closure 33 received in the open end of the housing 41. A potting compound 47 is poured into the housing 41, entirely filling the voids within the body and probe sections. A cap 49 having an annular groove 51 is placed over the end closure 33 with the peripheral lip 39 of closure 33 seated in groove 51. The interior chamber 53 of cap 49 encloses the loop antenna 60 and diode D-1, of the microwave receiver circuit for deriving the input power to the probe circuit and is preferably of non-metallic construction for maximum transmission of microwave energy. Teflon is preferred material for cap 49.

The metal walls of housing 41 provide shielding that limits transmission of the microwaves, thereby isolating the electronic components from the microwave energy. If desired the transmission of the broadcast very low to low frequency temperature modulated signal from ferrite core inductor $L_1$ can be enhanced by reducing the thickness of the wall of body section 43 surrounding inductor $L_1$. Alternatively, apertures could be provided in the wall of section 43 and these apertures could be filled or covered with a plastic film for hermetically sealing the housing. As shown in FIG. 5, the end closure 33 has an annular flange 55 which provides a mounting for a ceramic bushing 59. The bushing 59 has inner and outer metal coatings and is connected in the circuit to provide capacitor $C_4$ shown in FIG. 2. The bushing also provides for passage of wire leads that extend to microwave receiving loop antenna 60 which are preferably oriented at right angles for maximum reception of microwave energy. Diode $D_1$ can be located outside of housing 41.

Figure 3:
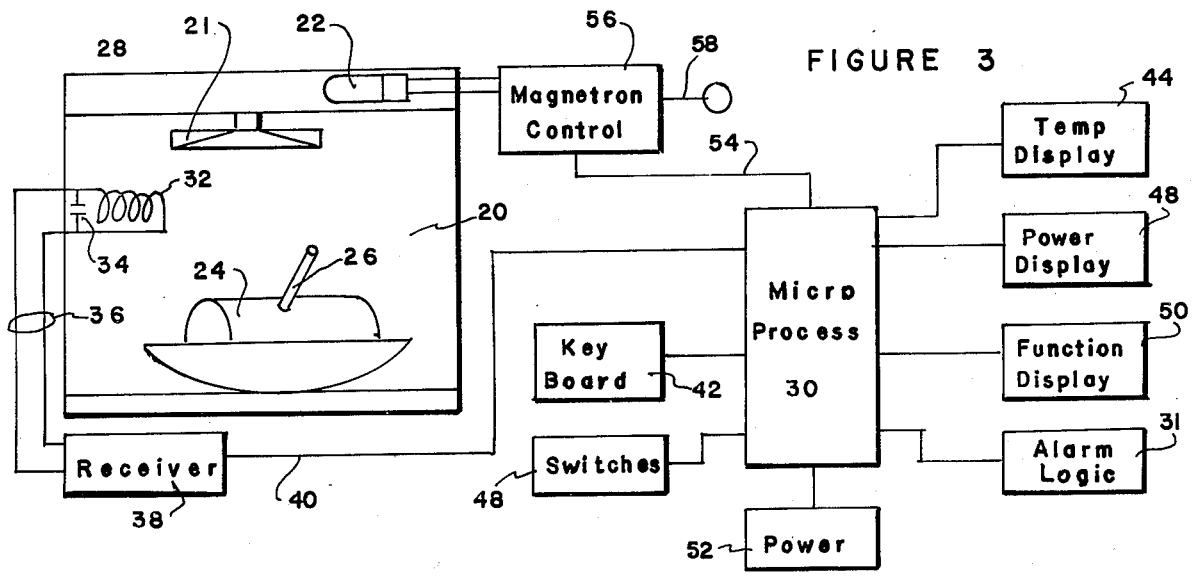
FIG. 3 is a schematic block diagram of a control which can be used to facilitate the practice of the method of the system and oven invention.
Figure 6:
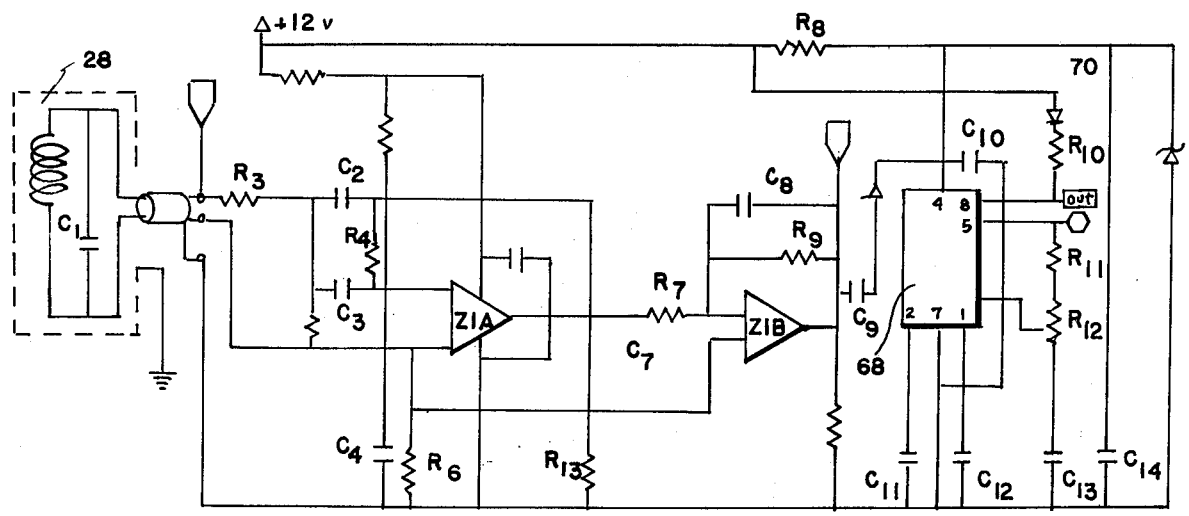
FIG. 6 is a circuit diagram of the system receiver circuit.

FIG. 6 is a schematic diagram of the receiver antenna 28 and circuit 38 illustrated in block diagram form in FIG. 3. Basically, the probe receiver 38 comprises a band pass filter, an amplifier including operational amplifiers Z1A and Z1B which feed a band limited amplified alternating current to the input frequency with a square wave output.

The band pass filter is conventional in design and will accept a range of frequencies between 13,000 and 15,000 Hz for the illustrated circuit. However, depending upon the particular components chosen, the frequency range may be modified.

The phase-locked loop 68 is also conventionally connected to track the input frequency and includes a loop filter capacitor C-11, an output filter capacitor C-12, and a timing capacitor C-13 which cooperates with adjusting resistor R-11 and potentiometer R-12 to adjust the center frequency to 14 kilohertz for the illustrated embodiment. The phase-locked output signal from pin 8 of Z-2 is connected through resistor R-10 and a light emitting diode 30 to indicate when a signal is being received.

Figure 7:
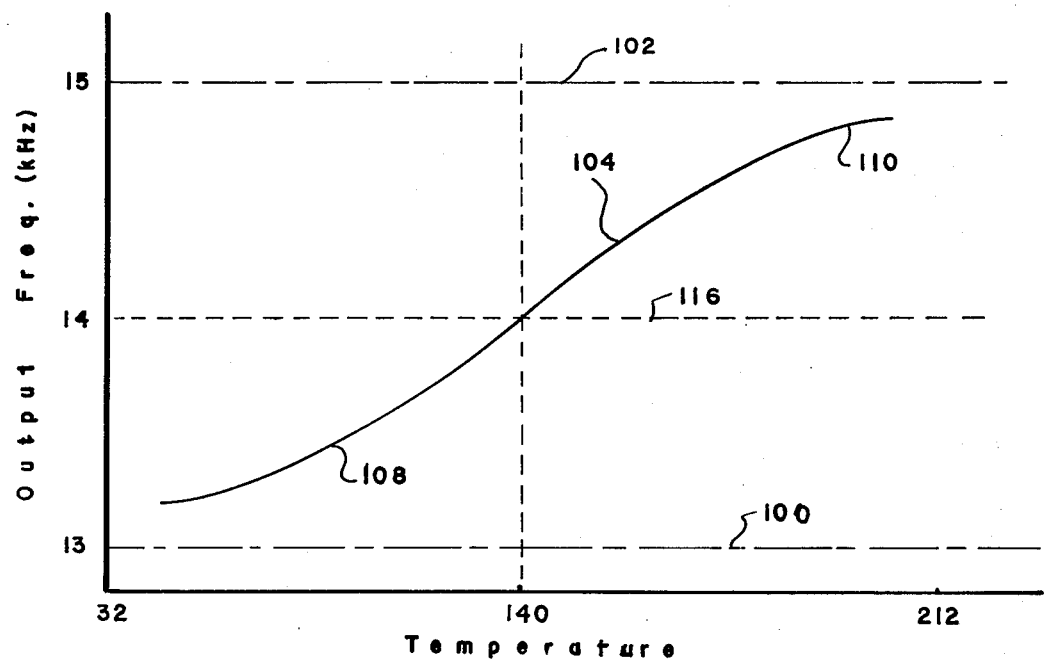
FIG. 7 is a graph of the probe broadcast frequency temperature relationship.

The output frequency of the phase-locked loop 68 is preferably adjusted to track the input frequency, corresponding to probe temperature, in a manner illustrated in FIG. 7. The response of the phase-locked loop 68 about its center frequency of 14 kilohertz is adjusted to be substantially linear in the range of ordinary finishing cooking temperatures, typically about 140° F. However, at the extremes of the probe temperature range, either at the freezing point of about 32° F. or at the extreme upper point of approximately 212° F., the response is adjusted to be substantially flat over a wide range of temperatures. This response is provided so that input frequencies to the phase-locked loop 68, which again correspond to probe temperature, will always be within the responsive range of the phase-locked loop and there will always be a controlling output frequency, regardless of calibration deviations of the input frequency or out-of-range temperatures. Thus, while the output frequency of the phase-locked loop 68 is substantially linear with temperature variation over the normal cooking ranges, for temperatures below and above that range, the output response of the phase-locked loop is tapered to a substantially flat response over a range of temperatures to prevent loss of a controlling output signal. The component values for the probe receiver are listed in Table 2 of the Appendix A.

FIG. 7 illustrates desirable operating characteristics of frequency versus temperature for an oven probe and receiver system. Typically, phase locked loops are available having a band width of 2 kilohertz identified in FIG. 7 by broken lines 100 and 102 at 13 kH and 15 kH, respectively.

The operating characteristics of the probe circuit are designed to have its output frequency (curve 104) intersect the middle frequency (line 106) of the band of the phase locked loop at or near an expected control temperature, e.g., at 140° F. The circuit's frequency response to sensed temperature (curve 104) is preferably linear through most of the control range and has deflection points 108 and 110 near the minimum and maximum band limits, typically selected at about 32° and 212° F. This insures that even if minor loss in calibration occurs, the output frequency will not exceed the band limit of the phase locked loop. The shape and slope of the output frequency response (curve 104) is acheived by selection of thermister $R_{15}$ with proper temperature characteristics and by the sizing of linearizing resistor $R_{11}$ and capacitor $C_1$.

Figure 8:
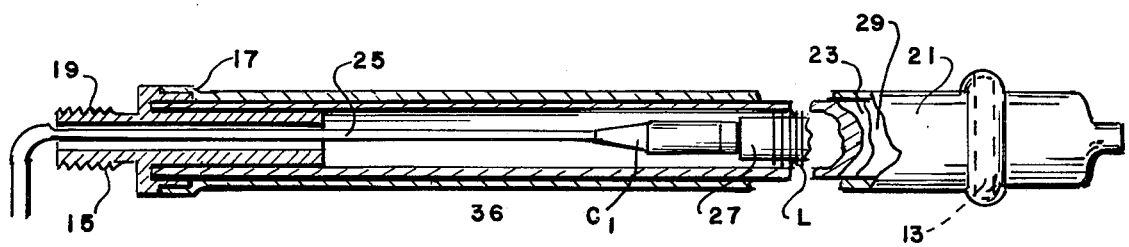
FIG. 8 is a sectional view of the receiver antenna.

The probe type receiving antenna 28 is shown in FIG. 8. The antenna is formed of coil L, comprising 1000 turns would on a ferrite rod 27 with the coil terminals connected to a shielded two conductor cable 36. Capacitor $C_1$ is connected across the terminals as shown in FIG. 6. The antenna coil and rod are mounted within a plastic tube 23 which is wrapped with one or more ble, preferably at a further reduction in power setting, e.g., at 5 to about 25 percent of the power which results in a more shallow incline in the temperature response curve A and in a coincidence or near coincidence with the true temperature curve B such that when the probe temperature reaches the desired final temperature, the microwave energy application is ceased and the comestible is at a true average temperature corresponding to the desired final temperature.

Figure 2:
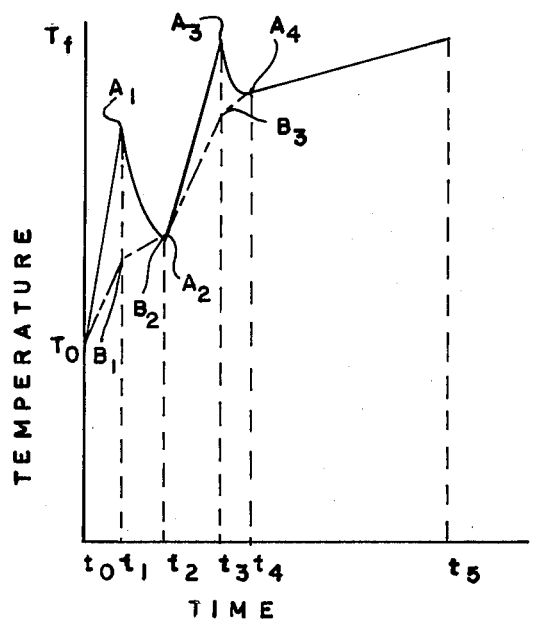

The aforedescribed cooking method can be varied in a number of ways, in all instances by controlling the application of microwave energy in reponse to the information obtained by observing the instantaneous temperature during the application of the microwave energy and at regular periodic intervals during brief interruptions of the application of the microwave energy. In instances where a small mass comestible is heated, the comestible will exhibit a very rapid temperature increase. This is shown in FIG. 2 and is reflected by a very short time period from $t_0$ to $t_1$ required for the comestible to exhibit a predetermined increase in temperature, T. This rapid increase dictates a very short resumption of full power application during the period from $t_2$ to $t_3$ or, alternatively, may dictate that a reduced power level at a longer time period be employed. Thereupon, the heating is interrupted, the comestible is permitted to equilibrate to its true temperature and the heating is resumed at a reduced power level where the true and instantaneous sensed temperatures are closely coincident, completing the cooking process at the time $t_5$.

Referring now to FIG. 3, there is illustrated a schematic block diagram of a control system which can be used to practice the method of this invention. The control system is employed in a microwave oven including an enclosure 20 and a source of microwave energy such as magnetron 22. Commonly, the magnetron is surrounded by a wave guide formed of a reflective metal to reflect the microwaves into the oven cavity. A device similar to a fan and commonly known as a stirrer fan 21 can be placed in the oven to obtain a uniform diffusion of the microwave transmission.

The microwave oven also includes the conventional facilities such as the on-off switch, a door innerlock switch and the transformer and other power supply components (not shown) mounted in the power supply housing 52. The power supply 52 is also connected to auxiliary equipment such as fans, infrared heater and the like (not shown).

A comestible 24 is placed within the oven and a wireless temperature probe 26 constructed in accordance with the present invention is placed therein. As will be described in further detail below, the microwave energy provided by the magnetron 22 not only cooks the comestible 24 but provides the power to operate the temperature probe 26. The probe 26 in turn radiates a temperature-dependent, very low radio frequency radiation to an antenna 28 mounted within the oven itself. The probe is constructed to absorb sufficient microwave energy for driving its operative circuitry yet has sufficient shielding to protect delicate components from excessive radiation.

The received signal from the antenna 28 is processed as a digital temperature signal which is compared to a preset temperature signal and when the received temperature signal is equal to the preset temperature, the microprocessor exercises control over the cooking cycle by processing signals through line 54 and the magnetron control unit. The microcomputer 30 compares temperatures and performs tasks such as displaying preset temperatures, actual temperatures, and the like, in convenient digital form and controls and displays the power level, the cooking function being performed and the various safety features such as an overtemperature alarm 31.

More particularly, the temperature probe 26 radiates a range of radio frequencies with a frequency range of approximately 13–15 kilohertz (kHz) and is temperature dependent throughout the range of normal cooking temperatures, e.g., from 32° to 212° F. In certain applications, the temperature may range from below freezing to well above the boiling point of water, such as in candy making. The receiving antenna 28 is sensitive to such frequencies and is furthermore shielded against microwave energy by a technique described below.

The receiving antenna is comprised of a conventional inductor 32 and capacitor 34 providing a tuned circuit which is sensitive to the transmitted range of frequencies and provides an output on a shielded two-wire transmission line 36 to a probe receiver 38 which converts the somewhat fluctuating radio frequency energy into relatively stable square wave pulses which can be received by a microcomputer 30 over a line 40.

In operation, the temperature probe 26 is placed in the comestible 24 and the comestible is placed in the microwave oven. By means of the keyboard 42, the desired temperature is then entered into the microcomputer 30 and verified by the visual digit display 44 which is of conventional form and includes four digits. Additionally, the desired initial power level may be entered into the microcomputer and displayed on a visual power level display 46. Alternatively, each of the desired temperature or power levels may be entered into the microcomputer by means of either slide switches 48 of potentiometers, or the like, depending upon the desired application. The microcomputer is powered by a conventional power supply 52 and the control signal generated by the microcomputer 30 is connected via line 54 to a magnetron control unit 56 which governs the conventional magnetron power on line 58 which is supplied to the magnetron 22.

FIG. 4 is an electronical schematic diagram of the wireless temperature probe 26 utilized in the present invention. A diode D-1 is looped back upon itself at one end of the probe with the loop 60 serving to rectify that microwave energy. The microwave energy is filtered by capacitor C-4. Because of the variable nature of microwave energy received by loop antenna 60, the received energy is applied to a conventional voltage regulator circuit including Zener diode D-3, transistor Q-1, and resistors R-12 and R-13.

The regulated D-C voltage is further filtered by capacitor C-3 and the voltage thus providing is connected to the positive and negative power terminals 62 and 64 of an integrated circuit Hex invertor 66 connected in an oscillator configuration. The oscillator circuit includes series and parallel connected invertors with the oscillator frequency determined by the timing resistors R-10 and R-11 and capacitor C-1 and thermistor R-15.

The frequency of oscillation is varied with temperature by means of thermistor R-15 connected across R-11 in the timing circuit for the oscillator. The output frequency is connected through a resistor R-14 to an inductor-capacitor tuned circuit including L-1 and C-2. Inductor L-1 serves as the transmitting antenna for the probe and is positioned within the probe.

layers of metal foil paper 29, foil side outside. The entire structure is then encased in a protective coating 21 which may be provided by dipping the structure in a plastic resin or the like or by a shrink tube. The antenna assembly is placed within the tube 23 and end cap 19 is placed over the open end of the tube. The cap 19 has an outer lip 17 that overlies the foil wrapped end of the tube and has a threaded shank 15 for mounting in the oven. Prior to coating, the opposite end of tube 23 is slid into a plastic spacer ring 13 to provide a spacer for the end of tha antenna 28 to prevent touching oven walls.

Figure 9:
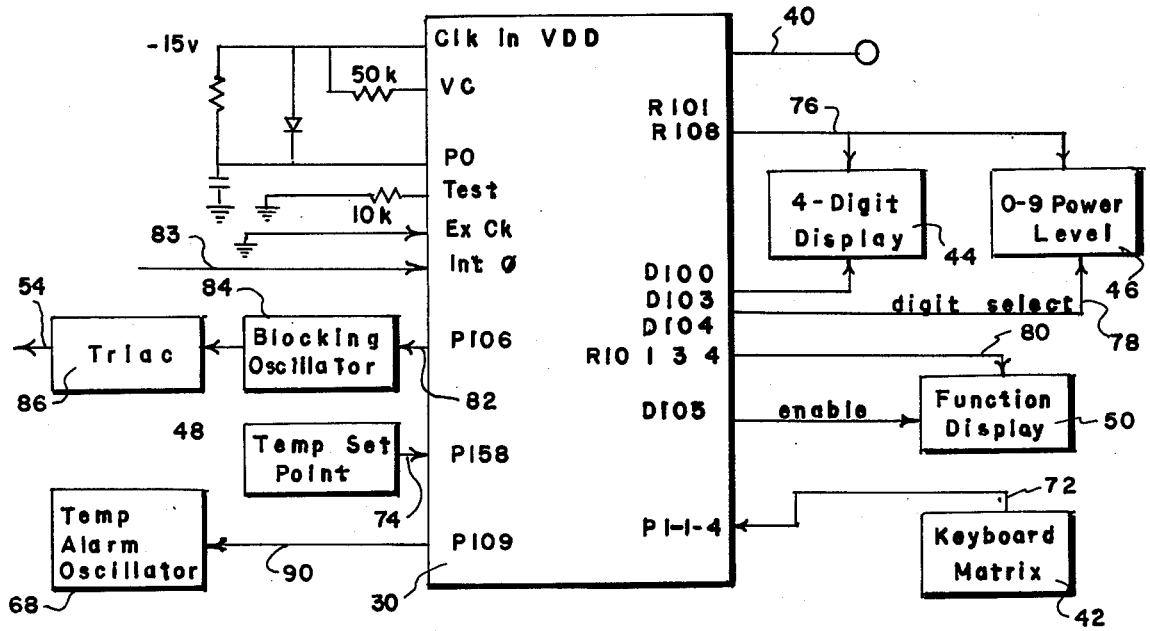
FIG. 9 is a block diagram of the microprocessor and peripheral devices useed in the control system.

A block diaphragm of the interconnections of the various elements to the microcomputer 30 is shown in FIG. 9. The microcomputer is Type PPA-4/1 available from Rockwell, Int., Microelectronic Device Division, 3310 Miraloma Avenue, Anaheim, California, 92803. As is well known, such a microcomputer is quite versatile and will operate in accordance with a specified ROM code which is loaded into a control ROM in accordance with a customer specification. A ROM code which can be utilized in a simple oven control system is listed in Appendix B.

As illustrated, a keyboard 42 matrix unit on a bus 72 provides an input to the microcomputer and, alternatively, a temperature set point slide switch 48 may also be used as an input on a bus 74. Which of the two types of inputs is actually utilized is a function of the desired form of operation for the entire control system.

A multiplexed four-digit, seven segment display 44 is conventionally operated by means of a segment select bus 76 and digit-select bus 78. The four-digit display 44 is operated either as a temperature display, desired or actual, or a timer display or clock display whenever the oven is not in use. In addition, the power displayed in a separate power level display unit 46. All functions are selected by means of keyboard 42. Additionally, if an auxiliary function such as the clock is selected by means of the keyboard, the fact that that function is in operation is indicated by means of a function display unit 50 operated by a means of a bus 80.

The temperature dependent frequency from the probe receiver 38 is entered on a serial data signal line 40 and handled internally for comparison with a set temperature by means of the specified ROM code. A number of necessary preset inputs for the type of operation of the microcomputer are provided by means of power supply voltage and other components such as resistors and capacitors to the various inputs as specified by the manufacturer and illustrated in FIG. 8. As the microcomputer has a clock function, a 60 Hertz clock signal is entered on a line 83. The control of the magnetron 22 is effected by means of an output signal on a line 82 which controls the frequency of operation of a blocking oxcillator 84 which in turn controls a Triac 86, connected to the magnetron control 22 through line 54.

Should the sensed temperature exceed the set temperature, a temperature alarm oscillator 88 is activated through a line 90. It should be understood that a conventional power supply providing the voltages specified by the manufacturer for the operation of the microcomputer is present but now shown to emphasize the functional aspects of the operation of the microcomputer control system.

The sequence of operation is begun by selecting the probe mode, entering the comestible temperature and pushing the start button. A check is made to confirm that the probe 26 is in the oven. This is effected by initially turning on the magnetron 22 for a brief period. This operation is necessary because the probe signal is only operational when powered by microwave energy.

Then a desired final cooking temperature is inputted into the microcomputer by means of the keyboard 42, or alternatively through the slide switches 48. Upon entry of the desired final temperature, the set point value appears in the four digit display 44. At this point, if the probe 26 is in the oven, a visual observation of the displayed set point is performed and if the set point value is not correct then the temperature is again entered. If the set point is correct, the magnetron 22 is again turned on by means of the start button on the keyboard 42. At this point, the probe signal is monitored to determine whether or not it is in the acceptable range and if not, the alarm is sounded and the oven is turned off. If the actual temperature is below the set point, an iterative loop is performed to again determine whether or not the probe signal is within the acceptable range. When the alarm is sounded and the oven turned off, then the complete sequence of operations must again be performed in order to operate the oven.

Figure 10:
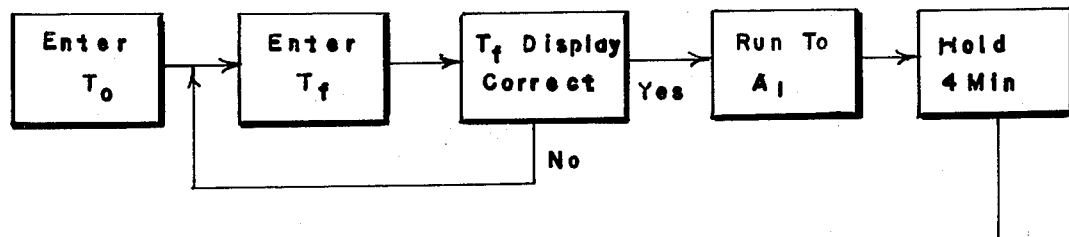
FIG. 10 is a flow chart of the system operation.
Figure 10:
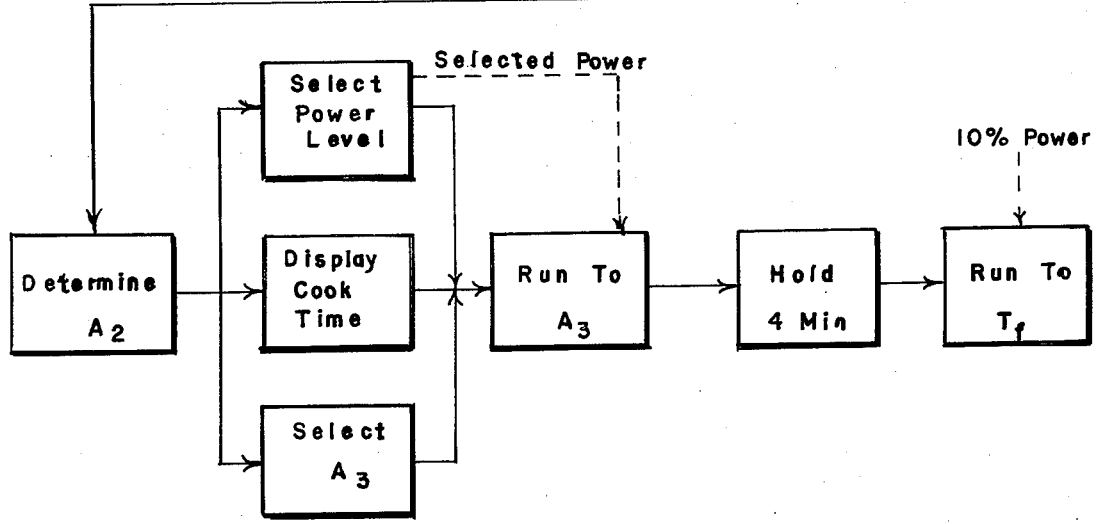

Once the preliminary checks have been performed, the oven control system becomes operational and the sequence of operation is shown in FIG. 10. The comestible temperature at the start of the cooking cycle is sensed by the probe and stored. The desired final temperature is entered and stored. The control system can have a pre-step temperature value $A_1$, which is the first control point reached at 100 percent power. When the sensed temperature reaches the $A_1$ value, the power supply to the magnetron is interrupted. Since $A_1$ is a preset, constant value, the microprocessor determines the temperature differential between the stored initial comestible temperature and the $A_1$ interruption temperature.

The comestible is permitted to rest in the oven during the short power interruption interval $t_1$ to $t_2$. This can be a variable time during which temperature is sensed at regular periodic intervals of 1 minute during this interval, the sensed temperature is stored for one interval and compared to the sensed temperature of the succeeding interval. If the probe was fortuitously positioned in the comestible, it will read the average or true temperature and there will be little or no significant differences between the temperatures sensed after the first and second intervals. More likely, however, the probe will read on anomalous temperature and a temperature differential will be sensed between the successive incremental temperature meansurements. The oven controls remain in the temperature monitoring mode so long as this differential exceeds a preselected value. This value can be preset for the particular oven, and a suggested value is about 0.2° to 0.35° F. This value is chosen as a value which exceeds the expected temperature drop by cooling of the comestible. A simpler control can, however, be used by providing a power interruption of a preset duration such as 4 minutes, at the end of which temperature $A_2$ is determined and is taken as the average or true temperature.

The microprocessor determines the length of time interval required to reach the first interruption temperature $T_1$ (difference between times $t_1$ and $t_0$). Based on the time interval, the power setting for the succeeding cooking period is selected.

Several predetermined values for the first time interval can be permanently stored in the microprocessor, each corresponding to a predetermined power level setting for the oven. Examples of suitable values are shown in the following table:

TABLE OF POWER SETTINGS

| Time Interval | Power Setting |
|---|---|
| 10 minutes | 100 percent maximum |
| 7 minutes | 85 percent maximum |
| 5 minutes | 70 percent maximum |
| 3 minutes | 55 percent maximum |
| 2.5 minutes | 40 percent maximum |
| 2 minutes | 30 percent maximum |
| 1.5 minutes | 20 percent maximum |
| 1 minute | 10 percent maximum |
| 30 seconds | 5 percent maximum |

The actual time interval to reach the first interruption temperature is compared to the preset intervals and the power setting is selected which corresponds to the exact or next lowest time interval. Thus, if the time interval is 60 minutes 50 seconds, the microprocessor selects a setting of 70 percent maximum power.

The final set temperature can also be used to preselect the next power interruption temperatures $A_3$ during which the comestible is again permitted to equilibrate to an average true temperature. Typical interruption temperature values for $A_3$ can be set at preselected intervals from the final temperature in accordance with the following table of values:

TABLE OF $T_3$ VALUES

| Final Temperature | Interruption Temperatures Below | Interruption Temperatures Above |
|---|---|---|
| 165 | 160 | 165 |
| 160 | 155 | 160 |
| 155 | 150 | 155 |
| 150 | 145 | 150 |
| 145 | 140 | 145 |
| 140 | 135 | 140 |
| 135 | 130 | 130 |
| 135 | 130 | 135 |

Interruption temperatures below the final temperature are selected by the microprocessor when the true (average) temperature exceeds the sensed temperature during heating, values $A_1$, $A_3$, and $A_5$ of FIG. 1. More frequently, the sensed temperature will exceed the true (average) temperature and the microprocessor will usually select the interruption temperatures from the "Above" column of the preceding Table.

The cooking time can also be determined and displayed by the system during the cooking process. A simple approximation of the cooking time can be made by the system based on the desired final (input) temperature and the time interval to reach the first interruption temperature ($t_1-t_0$). A series of predetermined cooking times can be stored and the appropriate cooking time can be selected by microprocessor for the particular combination of input final temperature and time interval to reach the first interruption temperature in accordance with the following table:

TABLE OF COOKING TIMES

| Time Interval | Final Temperature (Input) | | | | | | |
|---|---|---|---|---|---|---|---|
| | 165 | 160 | 155 | 150 | 145 | 140 | 135 |
| 10 minutes | 36 | 35 | 34 | 33 | 32 | 31 | 30 |
| 7 minutes | 32 | 31 | 30 | 29 | 28 | 27 | 26 |
| 5 minutes | 28 | 27.5 | 27 | 26 | 25.5 | 25 | 24 |
| 3 minutes | 22 | 21.5 | 21 | 20.5 | 20 | 19.5 | 19 |
| 2.5 minutes | 22.5 | 22 | 21.5 | 21 | 20 | 19.5 | 18.5 |
| 2 minutes | 22 | 21.5 | 20.5 | 20 | 19.5 | 18.5 | 18 |
| 1.5 minutes | 22.5 | 21.5 | 21 | 20.5 | 19.5 | 18.5 | 18 |
| 1 minute | 26 | 25 | 24 | 23 | 22 | 21 | 20 |
| 30 seconds | 25.5 | 24.5 | 23.5 | 22.5 | 21.5 | 20.5 | 19.5 |

The programmed power settings are selected from the values set forth in Table 1 after the first interruptions and at 10 percent power setting after the second interruption, except for the last line of 30 second time interval where the power setting was at 5 percent. The first and second interruption were for a predetermined, four-minute duration.

As illustrated in this example, the interruption period to permit the comestible to equilibrate to a true or average temperature can be of a fixed, predetermined magnitude. A suitable value could be four minutes. This avoids the necessity to monitor the temperature change during the interrupted power period.

The system then restores power to the magnetron at the selected power level and the cooking is continued to temperature $A_3$ where the power is again interrupted for a predetermined period, e.g., 4 minutes, and the comestible is permitted to equilibrate to a true average temperature. A low power setting, e.g., 10% is then selected to resume cooking to the desired final temperature.

The invention has been described with reference to the presently preferred embodiments thereof. It is not intended that the invention be unduly limited by this disclosure. Instead, it is intended that the invention be defined by the method steps, and their obvious equivalents set forth in the following claims.

What is claimed is:

1. A method for microwave cooking a comestible to a predetermined cooked temperature using a temperature instrument having a temperature sensitive element carried by a probe and a temperature received responsive thereto:
   (a) placing a comestible having an embedded temperature probe within a chamber;
   (b) exposing the comestible to microwave energy to cook said comestible and receiving an indicated temperature from said probe;
   (c) interrupting the application of microwave energy to the comestible when the indicated temperature received from said probe reaches a predetermined intermediate value, less than said predetermined cooked temperature;
   (d) permitting the indicated temperature of the comestible received from said probe to equilibrate to an average comestible temperature;
   (e) resuming the application of microwave energy to the comestible when the indicated temperature received from said probe stabilizes to substantially the average comestible temperature; and
   (f) controlling the appliation of said microwave energy in step (e) in response to said stabilized average temperature.

2. The method of claim 1 wherein said application of microwave energy in step (f) is controlled in response to the value of said stabilized temperature.

3. The method of claim 2 wherein said application of microwave energy in step (f) is controlled in inverse response to the difference in value between the said predetermined cooked and said stabilized temperatures.

4. The method of claim 2 including the steps of measuring the time increment for the comestible to reach said intermediate temperature and determining the rate of heating of said comestible by the temperature change and time increment during the exposure of said comestible to microwave energy in step (b) and controlling the application of microwave energy in step (f) in inverse response to the rate of heating of said comestible.

5. The method of claim 1 wherein the power level of said microwave energy applied in step (f) is selected in response to the length of time required to reach said predetermined intermediate temperature.

6. The method of claim 1 including the step of measuring the time increment for the comestible to reach said intermediate temperature and determining an approximate cooking time in response to said time increment and temperature change during the exposure of said comestible to microwave energy in step (b).

7. The method of claim 1 including the further steps of again interrupting the application of microwave energy to said comestible when the indicated temperature received from said probe approximates the predetermined cooked temperature, permitting the indicated temperature to equilibrate to substantially the average comestible temperature and thereafter resuming the application of microwave energy to said comestible at a power level of from 5 to about 25 percent maximum power.

* * * * *

UNITED STATES PATENT AND TRADEMARK OFFICE
CERTIFICATE OF CORRECTION

PATENT NO. : 4,230,731

DATED : October 28, 1980

INVENTOR(S) : Hugh J. Tyler

It is certified that error appears in the above-identified patent and that said Letters Patent are hereby corrected as shown below:

At column 2, Fig. 9, line 2 delete the word "useed" and substitute in place thereof the word --used--.

At column 4, line 1 delete the word "requried" and substitute in place thereof --required--.

At column 4, line 29 delete the word "than" and substitute in place thereof --then--.

At column 5, line 25 delete the word "by" and substitute in place thereof the word --be--.

At column 7, line 11 delete the word "antanna" and substitute in place thereof --antenna--.

At column 7, line 23 delete the word "Thermister" and substitute in place thereof the word --thermistor--.

At column 7, line 62 delete the word "comproses" and substitute in place thereof the word --comprises--.

UNITED STATES PATENT AND TRADEMARK OFFICE
CERTIFICATE OF CORRECTION

PATENT NO. : 4,230,731

DATED : October 28, 1980

INVENTOR(S) : Hugh J. Tyler

It is certified that error appears in the above-identified patent and that said Letters Patent are hereby corrected as shown below:

At column 8, line 59 delete the word "thermister" and substitute in place thereof the word --thermistor--.

At column 9, line 11 delete the word "tha" and substitute in place thereof the word --the--.

At column 10, line 48 delete the word "on" and substitute in place thereof the word --an--.

At column 10, line 50 delete the word "meansurements" and substitute in place thereof the word --measurements--.

At column 12, claim 1 (f), line 1 delete the word "appliation" and substitute in place thereof the word --application--.

Signed and Sealed this

Seventh Day of April 1981

[SEAL]

Attest:

RENE D. TEGTMEYER

Attesting Officer     Acting Commissioner of Patents and Trademarks